United States Patent Office 3,557,144
Patented Jan. 19, 1971

3,557,144
DERIVATIVES OF DIBENZOCYCLOHEPTENES
Marcia E. Christy, Perkasie, Pa., assignor to Merck & Co., Inc., Rahway, N.J., a corporation of New Jersey
No Drawing. Filed Aug. 20, 1968, Ser. No. 753,868
Int. Cl. C07d 71/00, 7/20
U.S. Cl. 260—327   18 Claims

ABSTRACT OF THE DISCLOSURE

Novel 10,11 - dihydro - 5,10 - epoxy - 5H - dibenzo[a,d]cycloheptenes, wherein the moiety substituted at the 5-position is a primary, secondary or tertiary-aminoethyl group, possessing anti-depressant activity are disclosed, as well as intermediates and processes for their preparation and use.

FIELD OF THE INVENTION

This invention relates to derivatives of dibenzocycloheptenes. In particular the invention relates to 10,11-dihydro - 5,10 - epoxy - 5H - dibenzo[a,d]cycloheptenes, substituted at the 5-position with an aminoethyl group, and methods of preparing and using the same. The invention also relates to novel intermediates useful in the preparation of the above compounds as well as processes for the preparation of said intermediates.

SUMMARY OF THE INVENTION

In accordance with this invention, there are provided 10,11 - dihydro - 5,10 - epoxy - 5H - dibenzo[a,d]cycloheptenes wherein the moiety substituted at the 5-position is a primary, secondary or tertiary-aminoethyl group.

Also disclosed are novel intermediates useful in producing the foregoing compounds, as well as processes for the preparation thereof, which employ the 5-aminopropyl bridged ether dibenzocycloheptenes of the prior art as starting materials.

DETAILED DESCRIPTION OF THE INVENTION

The derivatives of dibenzocycloheptenes of this invention are represented by the following structural formula:

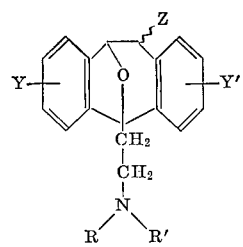

($\curvearrowright$ includes cis or trans isomers)

wherein Z is a nonoxidizing radical, or a radical which oxidizes to a ketone, as for example, hydrogen, hydroxy, ether (—OR), alkanoyloxy

sulfonamido (—NHSO$_2$R); when Z is hydroxy or alkanoyloxy, there can be a lower alkyl group replacing the hydrogen at the 11-position; R and R' can be the same or different, and are hydrogen or lower alkyl; and Y and Y' can be the same or different and are halo, trifluoro-loweralkyl, lower-alkoxy, lower-alkylmercapto, lower-alkylsulfonyl or dilower-alkylsulfamoyl.

Included within the scope of this invention are the pharmaceutically acceptable salts of the above compounds. Preferred are the pharmaceutically acceptable acid addition salts such as the hydrochloride, hydrogen mealeate and the like.

The compounds represented by the above formula, in either their free base or salt form, possess useful pharmacological properties. In particular, these compounds have been found to possess potent anti-depressant activity. As anti-depressants these compounds can be administered orally in the form of tablets, powders, capsules, sustained release pellets and the like or they may be administered orally or parenterally in the form of aqueous solutions or suspensions. Such formulations are prepared in conventional manner employing conventional pharmaceutical carriers and excipients as is demonstrated more fully hereinafter. When administered orally or parenterally, satisfactory results are obtained at a daily dosage level of from about 150 mg. to about 500 mg. It is preferred to administer the compounds in divided doses over the day in order to maintain effective blood levels. On this basis a dosage range of from about 50 mg./kg. to about 165 mg./kg. three times a day are employed. The compounds are preferably administered in the form of their non-toxic acid addition salts.

Illustrative of the anti-depressant compounds of this invention are 10,11 - dihydro - 5 - (aminoethyl) - 5,10-epoxy - 5H - dibenzo[a,d]cycloheptene; 10,11 - dihydro-5 - (2 - N - methylaminoethyl) - 5,10 - epoxy - 5H - dibenzo[a,d]cycloheptene; 10,11 - dihydro - 5 - (2 - N,N-dimethylaminoethyl) - 5,10 - epoxy - 5H - dibenzo[a,d]cycloheptene; 10,11 - dihydro - 5 - (2 - aminoethyl) - 5,10-epoxy - 11 - hydroxy - 5H - dibenzo[a,d]cycloheptene; 10,11 - dihydro - 5 - (2 - N - methylaminoethyl) - 5,10-epoxy - 11 - hydroxy - 5H - dibenzo[a,d]cycloheptene; 10,11 - dihydro - 2 - (2 - N,N - dimethylaminoethyl) - 5,10-epoxy - 11 - hydroxy - 5H - dibenzo[a,d]cycloheptene; 10,11 - dihydro - 3 - chloro - 5 - (2 - aminoethyl) - 5,10-epoxy - 5H - dibenzo [a,d]cycloheptene; 10,11 - dihydro-3 - bromo - 5 - (2 - N - methylaminoethyl) - 5,10 - epoxy-5H-dibenzo[a,d]cycloheptene and the like.

The compounds represented by the above structural formula can be prepared according to the following reaction sequence I:

(I)
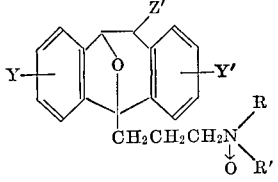

heat ↓

(II)
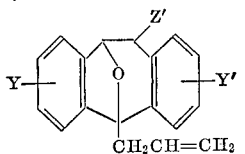

oxidize ↓

(III)
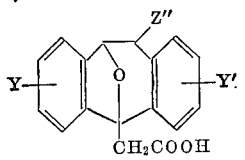

Prep. acid halide ↓

(IV)
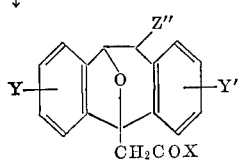

amination ↓

(V)
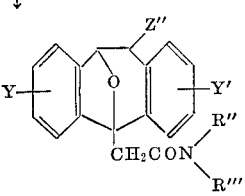

dehydration ↙    ↘ reduction (VI)
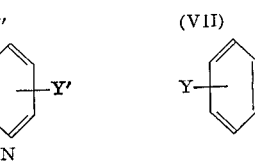

(VII)
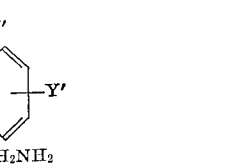

reduction ↓

(VIII)

wherein the definition of Y, Y', R and R' are as previously defined; Z' is as previously defined for Z, X is halo, preferably chloro or bromo; and the definition of Z", Z''', R" and R'" appear hereafter.

Referring to the above reaction sequence, the N-oxide derivative (I) is obtained from the known 5-(3-aminopropyl) - 5,10-epoxy-5H-dibenzo[a,d]cycloheptenes, disclosed in Belgian Patent No. 685,858, issued Feb. 23, 1967, according to the method disclosed therein encompassing reaction of the dibenzocycloheptene with hydrogen peroxide or peracids, such as peracetic acid, perbenzoic acid or perphthallic acid and the like.

The 5-allyl derivative (II) is novel and forms an embodiment of this invention. It is prepared by heating the N-oxide compound (1) at a temperature normally ranging from about 120° C. to about 200° C., and preferably about 150° C. Generally no solvent need be employed, since this facilitates the removal of by-product water and amine. However, a high boiling inert solvent can be employed to aid in control of temperature should this be desirable. Pressures in the range of atmospheric to about 10 mm. Hg, and preferably 20 mm. Hg, are normally employed. The resulting allylic derivative (II) can be recovered in conventional manner.

Oxidation of the allylic compound (II) produces the novel 5-acetic acid derivative (III). This intermediate forms an embodiment of this invention. Any conventional oxidizing agent can be employed as, for example, an alkali metal (preferably sodium or potassium) dichromate or permanganate. Furthermore, catalytic oxidation in the presence of a standard or conventional catalyst can be utilized. The oxidation can be carried out in aqueous solutions of inorganic acids, as for example, 3 N sulfuric acid using mild conditions, e.g. atmospheric pressure and temperatures ranging from about 20° C. to about 100° C. The amount of oxygen equivalent must be carefully controlled so that at least four equivalents of oxygen are provided to produce a predominance of the two carbon acid. It should be noted that when the allylic compound (II) is substituted at the 11-position with a trans hydroxy radical, this radical is converted to a keto group during the foregoing oxidation step. (Preparation of the cis series is discussed hereafter.) Such keto group remains unaffected in the remaining sequence until the reduction step and, thus, referring to the above reaction sequence, the definition of Z" in Formulas III–VI *excludes* hydroxy, but otherwise is the same as Z'.

The acid halide (IV) is another novel embodiment and is prepared by reaction of the acid (III) with either a thionylhalide, preferably thionylchloride, a phosphorus pentahalide, preferably phosphorus pentabromide or phosphorus pentachloride; or a phosphorus oxyhalide. The reaction can be carried out with or without an inert solvent. Temperatures ranging upwards from about 20° C. can be employed. In the absence of a solvent, temperatures ranging from about 25° C. to about 50° C. are preferred and reflux temperatures are preferred when a solvent is used. The reaction is generally carried out at atmospheric pressure.

Reaction of the acid halide (IV) with a primary or secondary amine, preferably a primary or secondary lower-alkyl amine, produces the amide (V), wherein either R" or R'" can be hydrogen, provided the other is lower-alkyl or both can be the same or different lower-alkyl groups. This intermediate is novel and forms an embodiment of this invention. The reaction can be carried out in an inert organic or aqueous media, preferably at ambient temperature and atmospheric pressure. Temperatures can range from 0° C. upwards to the decomposition temperature of the reactants and product. In general the reaction is carried out at temperatures below 25° C.

The desired secondary or tertiary amine end-product (VII) is prepared by reduction of the amide (V) using a conventional metal hydride reduction system, such as lithium aluminum hydride-catalytic aluminum chloride. In carrying out the reduction when the substituent Z" of compound V is keto, or —OCOR, these groups are converted to hydroxy. Thus, Z'" in Formulas VII and VIII *excludes* keto, and —OCOR, but otherwise is defined the same as Z'.

The primary amino end product (VIII) is prepared by dehydration of the amine (V) to produce the novel cyano derivative (VI) followed by reduction thereof using the above described conventional metal hydride reduction.

The dehydration step employs thionyl chloride or any other strong dehydrating agent such as acid anhydrides. The dehydration can be run at about 25° C. when dimethylformamide is used. Otherwise moderately higher temperatures on the order of 40° C. to 75° C. are used.

To produce the anti-depressant compounds of this invention wherein the 11-position is unsubstituted (that is wherein the only substituent in the 11-position is hydrogen), the following reaction sequence II, employing the 5-carboxylic acid (III) from Reaction Sequence I, wherein Z″ is keto, as a starting material can be employed.

Reaction Sequence II

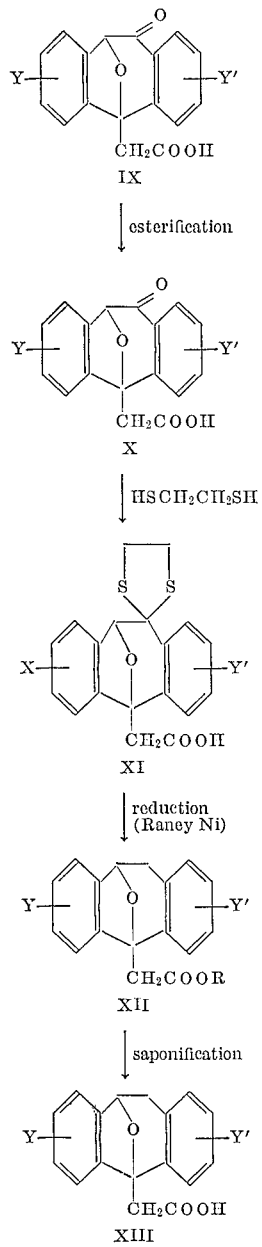

wherein Y and Y′ are as previously defined and R is alkyl or aryl, preferably lower-alkyl.

The acid (IX) is prepared according to the procedures above described for the preparation of the acid (III) utilizing as a starting material the N-oxide (I) wherein Z′ is hydroxy or keto.

The ester (X) is prepared by esterification of the acid (IX) using conventional procedures. Reaction of the ester with a dithiol (HS—R—SH where R is lower-alkyl) yields the thioketal (XI). Alternatively an alkyl mercaptan such as ethylmercaptan can be used in this step to produce the following compound.

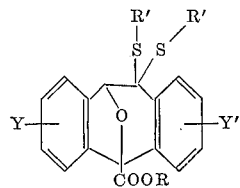

wherein R′ is lower alkyl. A standard condensation catalyst such as boron trifluoride etherate is generally used. It is preferred to effect this step under anhydrous conditions and at a temperature in the range of about 0° C. to about 50° C.

Conventional catalytic reductions of compound (XI), preferably using Raney nickel, produces the unsubstituted derivative (XII) which upon conventional saponification gives the desired 11-unsubstituted carboxylic acid (XIII). This compound can then be converted to the desired 11-unsubstituted aminoethyl derivative using the procedures described above for converting the acid (III) to the secondary or tertiary amine (VII) or the primary amine (VIII).

The following examples illustrate the methods and compounds of this invention.

Examples 1–5 illustrate the preparation of the starting materials of this invention, that is the appropriate N-oxide, from the 10,11 - dihydro - 5 - (aminopropyl) - 5,10-epoxy-5H-dibenzo [a,d]cycloheptenes described in Belgian Patent 685,858, issued Feb. 23, 1967.

EXAMPLE 1

Trans 10,11-dihydro-5-(3-dimethylaminopropyl)-5,10-epoxy-11-hydroxy-5H-dibenzo[a,d]cycloheptene N-oxide Trans 10,11 - dihydro-5-(3-dimethylaminopropyl)-5,10-epoxy-11-hydroxy-5H-dibenzo[a,d]cycloheptene, 2.06 g. (0.0067 mole), and 20 ml. of absolute methanol are stirred and cooled in an ice-bath. Hydrogen peroxide 2.3 g. of 30%, is added dropwise. Stirring is continued for 1 hour in the cold and for 19 hours at room temperature and the mixture then is allowed to stand for 24 hours at room temperature. After cooling in an ice-bath, the mixture is treated with a suspension of 100 mg. of 5% palladium on charcoal in 1 ml. of water and stirred at room temperature for 2½ hours when a test for peroxide is negative. After filtration through a mat of diatomaceous earth, the filtrate is evaporated below 40° C. under reduced pressure. The residual colorless glass weighs 2.3 g. after drying for 3 days in a vacuum desiccator over phosphorus pentoxide. The base is converted to the hydrogen maleate by dissolving it in 20 ml. of cold absolute ethanol and adding a solution of 860 mg. of maleic acid in 5 ml. of absolute ethanol. Dilution to incipient crystallization with 25 ml. of absolute ether precipitates the hydrogen maleate. [M.P. 151–152° C. dec., in a yield of 2.6 g.] Recrystallization from cold absolute methanol-absolute ether gives the product, [M.P. 155–156° C. dec.]

Analysis.—Calc'd for $C_{20}H_{23}NO_3 \cdot C_4H_4O_4$ (percent): C, 65.29; H, 6.16; N, 3.17. Found (percent): C, 65.37; H, 6.16; N, 3.13.

EXAMPLE 2

10,11-dihydro-5-(3-dimethylaminopropyl)-5,10-epoxy-5H-dibenzo[a,d]cyclohepten-11-one N-oxide 10,11 - dihydro-5-(3-dimethylaminopropyl)-5,10-epoxy-11-keto-5H-dibenzo[a,d]cycloheptene, (0.0067 mole), and 20 ml. of absolute methanol are stirred and cooled in an ice-bath. Hydrogen peroxide, 2.3 g. of 30%, is added dropwise. Stirring is continued for 1 hour in the cold and for 19 hours at room temperature and the mixture then is allowed to stand for 24 hours at room temperature. After cooling in an ice-bath, the mixture is treated with a suspension of 100 mg. of 5% palladium on charcoal in 1 ml. of water and stirred at room temperature for 2½ hours when a test for peroxide is negative. After filtration through a mat of diatomaceous earth, the filtrate is evaporated below 40° C. under reduced pressure. The residual colorless glass weighs 2.3 g. after drying for 3 days in a vacuum desiccator over phosphorus pentoxide. The base is converted to the hydrogen maleate by dissolving it in 20 ml. of cold absolute ethanol and adding a solution of 860 mg. of maleic acid in 5 ml. of absolute ethanol. Dilution to incipient crystallization with 25 ml. of absolute ether precipitates the hydrogen maleate. Recrystallization from cold absolute methanol-absolute ether gives the product.

EXAMPLE 3

10,11-dihydro-5-(3-dimethylaminopropyl)-5,10-epoxy-5H-dibenzo[a,d]cycloheptene N-oxide Following the procedure of Example 1, with the exception that 10,11-dihydro-5-(3-dimethylaminopropyl)-5,10-epoxy-5H-dibenzo[a,d]cycloheptene, (0.0067 mole) is substituted as a starting material, there is produced the above captioned product.

EXAMPLE 4

Trans 10,11-dihydro-5-(3-dimethylaminopropyl)-5,10-epoxy-11-methoxy-5H-dibenzo[a,d]cycloheptene N-oxide Trans 10,11 - dihydro-5-(3-dimethylaminopropyl)-5,10-epoxy-11-methoxy-5H-dibenzo[a,d]cycloheptene, (0.0067 mole), is substituted as a starting material in the procedure of Example 1 to produce the desired product in good yield.

EXAMPLE 5

Following the procedure of Example 1, with the exception that trans 10,11-dihydro-5-(3-dimethylaminopropyl)-5,10 - epoxy - 11 - metharoyloxy-5H-dibenzo[a,d]cycloheptene, (0.0067 mole) is substituted as a starting material, there is produced trans 10,11-dihydro-5-(3-dimethylaminopropyl)-5,10-epoxy - 11 - metharoyloxy-5H-dibenzo[a,d]cycloheptene N-oxide.

Similarly, following the procedure of Example 1, with the exception that the 0.0067 mole of the compound set forth in the following Table I under the caption "starting material" is substituted for the starting material utilized in Example 1, the compounds set forth in the following table under the caption "product" are produced.

nitrogen, starting at a bath temperature of 80° C. At 160° C., decomposition starts and the temperature is held at 158–160° C. until it appears to be complete in about 1½ hours. The dark brown residue is partitioned between ether and water. The etheral layer is washed with water, 0.5 M citric acid, and water, dried over anhydrous magnesium sulfate, and evaporated under reduced pressure. The residual solid, M.P. 117–119° C., is triturated with 5 ml. of ether giving the product as white crystals, M.P. 120–122° C. A sample for analysis, M.P. 120–121° C., is obtained by sublimation at 105° and 0.2 mm.

*Analysis.*—Calc'd for $C_{18}H_{16}O_2$ (percent): C, 81.79; H, 6.10. Found (percent): C, 81.37; H, 6.12.

By employing the respective N-oxide reactants set forth in Table I, and following the procedure of Example 6, with the exception that these N-oxides are substituted for the starting material utilized in Example 6, the corresponding 5-allyl derivatives are respectively produced as set forth in the following Table II.

Table II trans 5-allyl-10,11-dihydro-5,10-epoxy-11-methylsulfonamido-5H-dibenzo[a,d]cycloheptene trans 5-allyl-10,11-dihydro-5,10-epoxy-11-methyl-11-hydroxy-5H-dibenzo[a,d]cycloheptene trans 5-allyl-10,11-dihydro-5,10-epoxy-11-methyl-11-ethanoyloxy-5H-dibenzo[a,d]cycloheptene 5-allyl-10,11-dihydro-3-chloro-5,10-epoxy-11-keto-5H-dibenzo[a,d]cycloheptene 5-allyl-10,11-dihydro-7-chloro-5,10-epoxy-5H-dibenzo[a,d]cycloheptene 5-allyl-10,11-dihydro-2-chloro-5,10-epoxy-5H-dibenzo[a,d]cycloheptene 5-allyl-10,11-dihydro-8-chloro-5,10-epoxy-5H-dibenzo[a,d]cycloheptene 5-allyl-10,11-dihydro-3-bromo-5,10-epoxy-5H-dibenzo[a,d]cycloheptene trans 5-allyl-10,11-dihydro-3-trifluoromethyl-5,10-epoxy-11-hydroxy-5H-dibenzo[a,d]cycloheptene trans 5-allyl-10,11-d.hydro-3-methylsulfonyl-5,10-epoxy-11-hydroxy-5H-dibenzo[a,d]cycloheptene trans 5-allyl-10,11-dihydro-3-methylmercapto-5,10-epoxy-11-hydroxy-5H-dibenzo[a,d]cycloheptene trans 5-allyl-10,11-dihydro-3-dimethylsulfonyl-5,10-epoxy-11-hydroxy-5H-dibenzo[a,d]cycloheptene

TABLE I

| Starting material | Product |
| --- | --- |
| Trans 10,11-dihydro-5-(3-dimethylaminopropyl)-5,10-epoxy-11-methylsulfonamido-5H-dibenzo[a,d]cycloheptene. | Trans 10,11-dihydro-5-(3-dimethylaminopropyl)-5,10-epoxy-11-methylsulfonamido-5H-dibenzo[a,d]cycloheptene N-oxide. |
| Trans 10,11-dihydro-5-(3-dimethylaminopropyl)-5,10-epoxy-11-methyl-11-hydroxy-5H-dibenzo[a,d]cycloheptene. | Trans 10,11-dihydro-5-(3-dimethylaminopropyl)-5,10-epoxy-11-methyl-11-hydroxy-5H-dibenzo[a,d]cycloheptene N-oxide. |
| Trans 10,11-dihydro-5-(3-dimethylaminopropyl)-5,10-epoxy-11-methyl-11-ethanoyloxy-5H-dibenzo[a,d]cycloheptene. | Trans 10,11-dihydro-5-(3-dimethylaminopropyl)-5,10-epoxy-11-methyl-11-ethanoyloxy-5H-dibenzo[a,d]cycloheptene N-oxide. |
| 10,11-dihydro-3-chloro-5-(3-dimethylaminopropyl)-5,10-epoxy-11-keto-5H-dibenzo[a,d]-cycloheptene. | 10,11-dihydro-3-chloro-5-(3-dimethylaminopropyl)-5,10-epoxy-11-keto-5H-dibenzo[a,d]cycloheptene N-oxide. |
| 10,11-dihydro-7-chloro-5-(3-dimethylaminopropyl)-5,10-epoxy-5H-dibenzo[a,d]cycloheptene. | 10,11-dihydro-7-chloro-5-(3-dimethylaminopropyl)-5,10-epoxy-5H-dibenzo[a,d]cycloheptene N-oxide. |
| 10,11-dihydro-2-chloro-5-(3-dimethylaminopropyl)-5,10-epoxy-5H-dibenzo[a,d]cycloheptene. | 10,11-dihydro-2-chloro-5-(3-dimethylaminopropyl)-5,10-epoxy-5H-dibenzo[a,d]cycloheptene N-oxide. |
| 10,11-dihydro-8-chloro-5-(3-dimethylaminopropyl)-5,10-epoxy-5H-dibenzo[a,d]cycloheptene. | 10,11-dihydro-8-chloro-5-(3-dimethylaminopropyl)-5,10-epoxy-5H-dibenzo[a,d]cycloheptene N-oxide. |
| 10,11-dihydro-3-bromo-5-(3-dimethylaminopropyl)-5,10-epoxy-5H-dibenzo[a,d]cycloheptene. | 10,11-dihydro-3-bromo-5-(3-dimethylaminopropyl)-5,10-epoxy-5H-dibenzo[a,d]cycloheptene N-oxide. |
| Trans 10,11-dihydro-3-trifluoromethyl-5-(3-dimethylaminopropyl)-5,10-epoxy-11 hydroxy-5H-dibenzo[a,d]-cycloheptene. | Trans 10,11-dihydro-3-trifluoromethyl-5-(3-dimethylaminopropyl)-5,10-epoxy-11-hydroxy-5H-dibenzo[a,d]cycloheptene N-oxide. |
| Trans 10,11-dihydro-3-methylsylfonyl-5-(3-dimethylaminopropyl)-5,10-epoxy-11-hydroxy-5H-dibenzo[a,d]cycloheptene. | Trans 10,11-dihydro-3-methylsulfonyl-5-(3-dimethylaminopropyl)-5,10-epoxy-11-hydroxy-5H-dibenzo[a,d]cycloheptene N-oxide. |
| Trans 10,11-dihydro-3-methylmercapto-5-(3-dimethylaminopropyl)-5,10-epoxy-11-hydroxy-5H-dibenzo[a,d]cycloheptene. | Trans 10,11-dihydro-3-methylmercapto-5-(3-dimethylaminopropyl)-5,10-epoxy-11-hydroxy-5H-dibenzo[a,d]cycloheptene N-oxide. |
| Trans 10,11-dihydro-3-dimethylsulfonyl-5-(3-dimethylaminopropyl)-5,10-epoxy-11-hydroxy-5H-dibenzo[a,d]cycloheptene. | Trans 10,11-dihydro-3-dimethylsulfonyl-5-(3-dimethylaminopropyl)-5,10-epoxy-11-hydroxy-5H-dibenzo[a,d]cycloheptene N-oxide. |

The following series of examples, 6–10, illustrate the preparation of a 5-amino compound of this invention utilizing the reaction sequence I set forth above.

EXAMPLE 6

Trans 5-allyl-10,11-dihydro-5,10,epoxy-5H-dibenzo[a,d]cyclohepten-11-ol

Trans 10,11 - dihydro-5-(3-dimethylaminopropyl)-5,10-epoxy-5H-dibenzo[a,d]cyclohepten-11-ol N-oxide, 11.5 g. (0.03 mole) is heated at reduced pressure and under

EXAMPLE 7

10,11-dihydro-5,10-epoxy-11-keto-5H-dibenzo[a,d]cyclohepten-5-acetic acid

A stirred suspension of 10.0 g. (0.0378 mole) of trans 5-allyl-10,11-dihydro - 5,10 - epoxy-5H-dibenzo[a,d]cyclohepten-11-ol in 150 ml. of acetone-150 ml. of water is cooled in an ice-bath and treated with 7.5 ml. of 3 N sulfuric acid and a solution of 24 g. (0.15 mole) of potassium permanganate in 300 ml. of water. The mixture is stirred at room temperature for about 16 hours, then heated on the steam bath and filtered hot. The collected precipitate is washed with several portions of hot water. The combined filtrate and washings are cooled in an ice-bath, acidified with 12 ml. of 6 N hydrochloric acid, and the gummy product extracted into methylene chloride. Evaporation of the washed and dried extract under reduced pressure and trituration of the residue with 10 ml. of benzene yields the product as white crystals, M.P. 168–175° C., in a yield of 5.0 g. Recrystallization from benzene gives product, M.P. 193–198° C. A fully purified sample melts at 197–201° C.

*Analysis.*—Calc'd for $C_{17}H_{12}O_4$ (percent): C, 72.85; H, 4.32. Found (percent): C, 72.73; H, 4.21.

By employing the respective 5-allyl compounds of Table II and following the procedure of Example 7, with the exception that these 5-allyl compounds are substituted for the starting material utilized in Example 6, the corresponding 5-acetic acid derivatives are respectively produced as set forth in the following Table III.

Table III trans 10,11-dihydro-5,10-epoxy-11-methylsulfonamido-5H-dibenzo[a,d]cyclohepten-5-acetic acid
trans-10,11-dihydro-5,10-epoxy-11-methyl-11-hydroxy-5H-dibenzo[a,d]cyclohepten-5-acetic acid
trans 10,11-dihydro-5,10-epoxy-11-methyl-11-ethanoyloxy-5H-dibenzo[a,d]cyclohepten-5-acetic acid
10,11-dihydro-3-chloro-5,10-epoxy - 11-keto-5H-dibenzo[a,d]cyclohepten-5-acetic acid
10,11-dihydro-7-chloro-5,10 - epoxy-5H-dibenzo[a,d]cyclohepten-5-acetic acid
10,11-dihydro-2-chloro-5,10-epoxy - 5H-dibenzo[a,d]cyclohepten-5-acetic acid
10,11-dihydro-8-chloro-5,10-epoxy - 5H-dibenzo[a,d]cyclohepten-5-acetic acid
10,11-dihydro-3-bromo-5,10-epoxy - 5H-dibenzo[a,d]cyclohepten-5-acetic acid ,
trans 10,11-dihydro-3-trifluoromethyl-5,10-epoxy-11-hydroxy-5H-dibenzo[a,d]cyclohepten-5-acetic acid
trans 10,11-dihydro-3-methylsulfonyl-5,10-epoxy-11-hydroxy-5H-dibenzo[a,d]cyclohepten-5-acetic acid
trans 10,11-dihydro-3-methylmercapto-5,10-epoxy-11-hydroxy-5H-dibenzo[a,d]cyclohepten-5-acetic acid
trans 10,11-dihydro-3-dimethylsulfonyl-5,10-epoxy-11-hydroxy-5H-dibenzo[a,d]cyclohepten-5-acetic acid

EXAMPLE 8

10,11-dihydro-5,10-epoxy-11-keto-5H-dibenzo[a,d]cyclohepten-5-acetamide

A stirred suspension of 10,11-dihydro-5-10-epoxy-11-keto-5H-dibenzo[a,d]cyclohepten-5-acetic acid, 3.2 g. (0.0114 mole), in 25 ml. of dry benzene is treated with 5 ml. of thionyl chloride and heated to refluxing for 2 hours. Solvents are removed under reduced pressure, the residue redissolved in benzene, and the solution again evaporated under reduced pressure leaving the crude acid chloride, 10, 11-dihydro-5,10-epoxy-11-keto-5H-dibenzo[a,d]cyclohepten-5-acetyl chloride, as a yellow oil. This residue is dissolved in 15 ml. of acetone and the solution added dropwise with stirring to 35 ml. of concentrated ammonium hydroxide. The precipitated product is collected, washed with water and dried; yield, 2.65 g. (83%); M.P. 237–239° C. dec.

By employing the respective 5-acetic acid derivatives of Table III and following the procedure of Example 8, with the exception that these 5-acetic acid derivatives are substituted for the starting material utilized in Example 8, the corresponding 5-acetamides are respectively produced as set forth in the following Table IV.

Table IV trans N-methyl-10,11-dihydro-5,10-epoxy-11-methylsulfonamido-5H-dibenzo[a,d]cyclohepten-5-acetamide
trans N-methyl-10,11-dihydro-5,10-epoxy-11-methyl-11-hydroxy-5H-dibenzo[a,d]cyclohepten-5-acetamide
trans N-methyl-10,11-dihydro-5,10-epoxy-11-methyl-11-ethanoyloxy-5H-dibenzo[a,d]cyclohepten-5-acetamide
N-methyl-10,11- dihydro-3-chloro-5,10-epoxy-11-keto-5H-dibenzo[a,d]cyclohepten-5-acetamide
N-methyl-10,11-dihydro-7-chloro-5,10-epoxy-5H-dibenzo[a,d]cyclohepten-5-acetamide
N-methyl-10,11-dihydro-2-chloro-5,10-epoxy-5H-dibenzo[a,d]cyclohepten-5-acetamide
N-methyl-10,11-dihydro-8-chloro-5,10-epoxy-5H-dibenzo[a,d]cyclohepten-5-acetamide
N-methyl-10,11-dihydro-3-bromo-5,10-epoxy-5H-dibenzo[a,d]cyclohepten-5-acetamide
trans N-methyl-10,11-dihydro-3-trifluoromethyl-5,10-epoxy-11-hydroxy-5-H-dibenzo[a,d]cyclohepten-5-acetamide
trans N-methyl-10,11-dihydro-3-methylsulfonyl-5,10-epoxy-11-hydroxy-5-H-dibenzo[a,d]cyclohepten-5-acetamide
trans N-methyl-10,11-dihydro-3-methylmercapto-5,10-epoxy-11-hydroxy-5-H-dibenzo[a,d]cyclohepten-5-acetamide
trans N-methyl-10,11 - dihydro-3-dimethylsulfonyl-5,10-epoxy-11-hydroxy-5-H-dibenzo[a,d]cyclohepten-5-acetamide

EXAMPLE 9

10,11-dihydro-5,10-epoxy-11-keto-5H-dibenzo[a,d]cyclohepten-5-acetonitrile 10,11 - dihydro - 5,10-epoxy-11-keto-5H-dibenzo[a,d]cyclohepten-5-acetamide, 280 mg. (00.001 mole), in 1.5 ml. of dry dimethylformamide, is treated with 0.08 ml. of thionyl chloride added dropwise with stirring and cooling in an ice-bath. After about 7½ hours at room tempreature, the solution is poured onto ice. The product precipitates and is collected, washed with water and dried; yield, 210 mg., M.P. 165–168° C. A sample for analysis M.P. 172–174° C., is obtained by recrystallization from benzene-hexane and two sublimations at 153–154° C. and 0.05 mm.

*Analysis.*—Calc'd for $C_{17}H_{11}NO_2$ (percent): C, 78.15; H, 4.24; N, 5.36. Found (percent): C, 77.52; H, 4.09; N, 5.12.

By employing the respective acetamides set forth in Table IV and following the procedure of Example 9, with the exception that these 5-acetamides are substituted for the starting material utilized in Example 9, the corresponding 5-acetonitriles of this invention are respectively produced, as set forth in Table V.

Table V trans 10,11-dihydro-5,10-epoxy-11-methylsulfonamido-5H-dibenzo[a,d]cyclohepten-5-acetonitrile
trans 10,11-dihydro-5,10-epoxy-11-methyl-11-hydroxy-5H-dibenzo[a,d]cyclohepten-5-acetonitrile
trans 10,11-dihydro-5,10-epoxy-11-methyl-11-ethanoyloxy-5H-dibenzo[a,d]cyclohepten-5-acetonitrile
10,11-dihydro-3-chloro-5,10-epoxy-11-keto-5H-dibenzo[a,d]cyclohepten-5-acetonitrile
10,11-dihydro-7-chloro-5,10-epoxy-5H-dibenzo[a,d]cyclohepten-5-acetonitrile
10,11-dihydro-2-chloro-5,10-epoxy-5H-dibenzo[a,d]cyclohepten-5-acetonitrile
10,11-dihydro-8-chloro-5,10-epoxy-5H-dibenzo[a,d]cyclohepten-5-acetonitrile
10,11-dihydro-3-bromo-5,10-epoxy-5H-dibenzo[a,d]cyclohepten-5-acetonitrile
trans 10,11-dihydro-3-trifluoromethyl-5,10-epoxy-11-hydroxy-5H-dibenzo[a,d]cyclohepten-5-acetonitrile
trans 10,11-dihydro-3-methylsulfonyl-5,10-epoxy-11-hydroxy-5H-dibenzo[a,d]cyclohepten-5-acetonitrile
trans 10,11-dihydro-3-methylmercapto-5,10-epoxy-11-hydroxy-5H-dibenzo[a,d]cyclohepten-5-acetonitrile
trans 10,11-dihydro-3-dimethylsulfonyl-5,10-epoxy-11-hydroxy-5H-dibenzo[a,d]cyclohepten-5-acetonitrile

EXAMPLE 10

Trans 10,11-dihydro-5,10-epoxy-11-hydroxy-5H-dibenzo[a,d]cyclohepten-5-ethylamine Lithium aluminum hydride, 60 mg. (0.00158 mole), is weighed under nitrogen, transferred to a dry nitrogen-flushed reaction flask, and suspended in 2 ml. of absolute ether. A solution of 210 mg. (0.00158 mole) of aluminum chloride in 3 ml. of absolute ether is added dropwise and the mixture, containing a white precipitate, is stirred for 10 min. at room temperature. A solution of 205 mg. (0.000785 mole) of 10,11-dihydro-5,10-epoxy-11-keto-5H-dibenzo[a,d]cyclohepten-5-acetonitrile in 25 ml. of absolute ether-10 ml. of dry benzene is added rapidly dropwise and the mixture is stirred at room temperature under a slow stream of nitrogen for about 18 hours. After cooling in an ice-bath, the complex is hydrolyzed by the dropwise addition of 1 ml. of water. The ethereal layer is decanted and the gelatinous precipitate washed with two portions of ether. The precipitate then is suspended in 2 ml. of 40% aqueous sodium hydroxide and 35 ml. of water and the mixture is extracted with several portions of ether-benzene (1:1). The washed and dried organic extract is evaporated under reduced pressure leaving the product as the residual oil in a yield of 73 mg.

The base is converted to the hydrogen maleate salt by treating a solution in ethanol with a slight excess of an ethanolic solution of maleic acid. Dilution with ether precipitates trans 10,11-dihydro-5,10-epoxy-11-hydroxy-5H-dibenzo[a,d]cyclohepten-5-ethylamine hydrogen maleate as white crystals, M.P. 188–190° C. dec. An analytical sample melts at 190–191° C. dec. after recrystallization from absolute ethanol-absolute ether.

Analysis.—Calc'd for $C_{17}H_{17}NO_2$ (percent): $C_4H_4O_4$: C, 65.78; H, 5.52. Found (percent): C, 66.05; H, 5.77.

Examples 11–16 illustrate the preparation of a 5-alkyl substituted amino compound of this invention unsubstituted at the 11-position (that is wherein hydrogen is the only substituent), utilizing reaction sequence II set forth above. In this series of examples the desired end-product is a secondary amine. However, a tertiary amine can easily be prepared by substituting the appropriate tertiary amine for the secondary amine employed in Example 15.

EXAMPLE 11

Methyl 10,11-dihydro-5,10-epoxy-11-keto-5H-dibenzo[a,d]cyclohepten-5-acetate 10,11-dihydro-5,10-epoxy-11-keto-5H-dibenzo[a,d] cyclohepten-5-acetic acid, 0.011 mole, p-toluenesulfonic acid monohydrate, 1.2 g., and 60 ml. absolute methanol are stirred at refluxing for 4 hours. Methanol is distilled under reduced pressure and the residue dissolved in benzene. The benzene extract is washed with water, saturated sodium bicarbonate, and water, dried over anhydrous sodium sulfate, and evaporated under reduced pressure to yield the desired product.

EXAMPLE 12

Ethylene thioketal of methyl-10,11-dihydro-5,10-epoxy-11-keto-5H-dibenzo[a,d]cyclohepten-5-acetate Methyl-10,11-dihydro-5,10-epoxy-11-keto-5H-dibenzo[a,d]cyclohepten-5-acetate, .001 mole, in 6 ml. of glacial acetic acid is treated with 0.3 ml. of ethanedithiol and 0.6 ml. of boron trifluoride etherate. The mixture is stirred at room temperature for about 16 hours, white precipitate separating after 3–4 hours. The precipitate is collected, washed and air-dried.

EXAMPLE 13

Methyl-10,11-dihydro-5,10-epoxy-5H-dibenzo[a,d] cyclohepten-5-acetate

The ethylene thioketal of methyl-10,11-dihydro-5,10-epoxy-11-keto-5H-dibenzo[a,d]cyclohepten-5-acetate, .00256 mole, in 130 ml. of absolute ethanol is stirred at refluxing with about 9 g. of freshly prepared W-7 Raney nickel for 3½ hours. The nickel is removed and washed several times with warm ethanol by centrifugation. The combined ethanolic supernatant solutions are evaporated under reduced pressure and the residue dissolved in benzene. The benzene solution, after filtration through a mat of diatomaceous earth to remove the last traces of nickel, is evaporated to dryness under reduced pressure, leaving the product.

EXAMPLE 14

10,11-dihydro-5,10-epoxy-5H-dibenzo[a,d]cyclohepten-5-acetic acid

A solution of methyl 10,11-dihydro-5,10-epoxy-5H-dibenzo[a,d]cyclohepten-5-acetate, .00256 mole, in 10 ml. of 95% ethanol is heated to refluxing with 2.5 ml. of 5% aqueous sodium hydroxide for 2½ hours. Ethanol is distilled under reduced pressure and the residue dissolved in water. The solution is cooled in an ice bath, acidified with 3 N hydrochloric acid, and the precipitated product extracted into methylene chloride. The product is isolated by evaporation, washing and drying under reduced pressure.

EXAMPLE 15

N-methyl-10,11-dihydro-5,10-epoxy-5H-dibenzo[a,d]cyclohepten-5-acetamide 10,11-dihydro-5,10-epoxy-5H-dibenzo[a,d]cyclohepten-5-acetic acid, .00246 mole, in 7 ml. of dry benzene is treated with 0.7 ml. of thionyl chloride and the solution heated to refluxing for 3 hours. Solvents are removed under reduced pressure, the residue redissolved in benzene, and the solution again evaporated to dryness under reduced pressure. The residual oily yellow acid chloride dissolved in 6 ml. of dry acetone is added dropwise with stirring to 8 ml. of 40% aqueous ethylamine at room temperature. After 1½ hours, the bulk of the acetone and ethylamine is distilled under reduced pressure and the residue partitioned between benzene and water. The benzene layer is separated, washed, dried and evaporated under reduced pressure to yield the crude product.

EXAMPLE 16

10,11-dihydro-5-(2-N-methylaminoethyl)-5,10-epoxy-5H-dibenzo[a,d]cycloheptene

Lithium aluminum hydride, .0026 mole, is weighed under nitrogen, transferred to a dry, nitrogen-flushed reaction flask, and suspended in 5 ml. of absolute ether. A solution of .0024 mole of aluminum chloride in 10 ml. of absolute ether is added dropwise, and the mixture, containing a white precipitate, is stirred for 10 min. at room temperature. A solution of .00113 mole of N-methyl-10,11-dihydro-5,10-epoxy-5H-dibenzo[a,d]cyclohepten-5-acetamide in 150 ml. of absolute ether is added rapidly dropwise and the mixture is stirred at room temperature under a slow stream of nitrogen for about 18 hours. After cooling in an ice-bath, hydrolysis is effected by the dropwise addition of 1.5 ml. of water. The ethereal layer is decanted and the residual precipitate washed with two portions of boiling ether. The precipitate then is partially dissolved in 10 ml. of 10 N sodium hydroxide and 40 ml. of water and the mixture is extracted with several portions of benzene-ether (1:1). The washed and dried organic extract is evaporated to dryness under reduced pressure, leaving the product.

By employing the foregoing methods, the following compounds further exemplify the end-products of this invention:

10,11-dihydro-3-chloro-5-(2-N-methylaminoethyl)-5,10-epoxy-5H-dibenzo[a,d]cycloheptene;
10,11-dihydro-3-chloro-5-(2-N,N-dimethylaminoethyl)-5,10-epoxy-5H-dibenzo[a,d]cycloheptene;
10,11-dihydro-3-chloro-5-(2-aminoethyl)-5,10-epoxy-11-hydroxy-5H-dibenzo[a,d]cycloheptene;

10,11-dihydro-3-chloro-5-(2-N-methylaminoethyl)-5,10-epoxy-11-hydroxy-5H-dibenzo[a,d]cycloheptene;
10,11-dihydro-3-chloro-5-(2-N,N-dimethylaminoethyl)-5,10-epoxy-11-hydroxy-5H-dibenzo[a,b]cycloheptene;
10,11-dihydro-7-chloro-5-(2-aminoethyl)-5,10-epoxy-5H-dibenzo[a,d]cycloheptene;
10,11-dihydro-7-chloro-5-(2-N-methylaminoethyl)-5,10-epoxy-5H-dibenzo[a,d]cycloheptene;
10,11-dihydro-7-chloro-5-(2,N,N-dimethylaminoethyl)-5,10-epoxy-5H-dibenzo[a,d]cycloheptene;
10,11-dihydro-7-chloro-5-(2-aminoethyl)-5,10-epoxy-11-hydroxy-5H-dibenzo[a,d]cycloheptene;
10,11-dihydro-7-chloro-5-(2-N-methylaminoethyl)-5,10-epoxy-11-hydroxy-5H-dibenzo[a,d]cycloheptene;
10,11-dihydro-7-chloro-5-(2-N,N-dimethylaminoethyl)-5,10-epoxy-11-hydroxy-5H-dibenzo[a,d]cycloheptene;
10,11-dihydro-2-chloro-5-(2-aminoethyl)-5,10-epoxy-5H-dibenzo[a,d]cycloheptene;
10,11-dihydro-2-chloro-5-(2-N-methylaminoethyl)-5,10-epoxy-5H-dibenzo[a,d]cycloheptene;
10,11-dihydro-2-chloro-5-(2-N,N-dimethylaminoethyl)-5,10-epoxy-5H-dibenzo[a,d]cycloheptene;
10,11-dihydro-2-chloro-5-(2-aminoethyl)-5,10-epoxy-11-hydoxy-5H-dibenzo[a,d]cycloheptene;
10,11-dihydro-2-chloro-5-(2-N-methylaminoethyl)-5,10-epoxy-11-hydroxy-5H-dibenzo[a,d]cycloheptene;
10,11-dihydro-2-chloro-5-(2-N,N-dimethylaminoethyl)-5,10-epoxy-11-hydroxy-5H-dibenzo[a,d]cycloheptene;
10,11-dihydro-8-chloro-5-(2-aminoethyl)-5,10-epoxy-5H-dibenzo[a,d]cycloheptene;
10,11-dihydro-8-chloro-5-(2-N-methylaminoethyl)-5,10-epoxy-5H-dibenzo[a,d]cycloheptene;
10,11-dihydro-8-chloro-5-(2-N,N-dimethylaminoethyl)-5,10-epoxy-5H-dibenzo[a,d]cycloheptene;
10,11-dihydro-8-chloro-5-(2-aminoethyl)-5,10-epoxy-11-hydroxy-5H-dibenzo[a,d]cycloheptene;
10,11-dihydro-8-chloro-5-(2-N-methylaminoethyl)-5,10-epoxy-11-hydroxy-5H-dibenzo[a,d]cycloheptene;
10,11-dihydro-8-chloro-5-(2-N,N-dimethylaminoethyl)-5,10-epoxy-11-hydroxy-5H-dibenzo[a,d]cycloheptene;
10,11-dihydro-3-bromo-5-(2-aminoethyl)-5,10-epoxy-5H-dibenzo[a,d]cycloheptene;
10,11-dihydro-3-bromo-5-(2-N-methylaminoethyl)-5,10-epoxy-11-hydroxy-5H-dibenzo[a,d]cycloheptene;
10,11-dihydro-3-bromo-5-(2-N,N-dimethylaminoethyl)-5,10-epoxy-5H-dibenzo[a,d]cycloheptene;
10,11-dihydro-3-bromo-5-(2-aminoethyl)-5,10-epoxy-11-hydroxy-5H-dibenzo[a,d]cycloheptene;
10,11-dihydro-3-bromo-5-(2-N-methylaminoethyl)-5,10-epoxy-11-hydroxy-5H-dibenzo[a,d]cycloheptene;
10,11-dihydro-3-bromo-5-(2-N,N-dimethylaminoethyl)-5,10-epoxy-11-hydroxy-5H-dibenzo[a,d]cycloheptene;
10,11-dihydro-7-bromo-5-(2-aminoethyl)-5,10-epoxy-5H-dibenzo[a,d]cycloheptene;
10,11-dihydro-7-bromo-5-(2-N-methylaminoethyl)-5,10-epoxy-5H-dibenzo[a,d]cycloheptene;
10,11-dihydro-7-bromo-5-(2-N,N-dimethylaminoethyl)-5,10-epoxy-5H-dibenzo[a,d]cycloheptene;
10,11-dihydro-7-bromo-5-(2-aminoethyl)-5,10-epoxy-11-hydroxy-5H-dibenzo[a,d]cycloheptene;
10,11-dihydro-7-bromo-5-(2-N-methylaminoethyl)-5,10-epoxy-11-hydroxy-5H-dibenzo[a,d]cycloheptene;
10,11-dihydro-7-bromo-5-(2-N,N-dimethylaminoethyl)-5,10-epoxy-11-hydroxy-5H-dibenzo[a,d]cycloheptene;
10,11-dihydro-3-trifluoromethyl-5-(2-aminoethyl)-5,10-epoxy-5H-dibenzo[a,d]cycloheptene;
10,11-dihydro-3-trifluoromethyl-5-(2-N-methylaminoethyl)-5,10-epoxy-5H-dibenzo[a,d]cycloheptene;
10,11-dihydro-3-trifluoromethyl-5-(2-N,N-dimethylaminoethyl)-5,10-epoxy-5H-dibenzo[a,d]cycloheptene;
10,11-dihydro-3-trifluoromethyl-5-(2-aminoethyl)-5,10-epoxy-11-hydroxy-5H-dibenzo[a,d]cycloheptene;
10,11-dihydro-3-trifluoromethyl-5-(2-N-methylaminoethyl)-5,10-epoxy-11-hydroxy-5H-dibenzo[a,d]cycloheptene;
10,11-dihydro-3-trifluoromethyl-5-(2-N,N-dimethylaminoethyl)-5,10-epoxy-11-hydroxy-5H-dibenzo[a,d]cycloheptene;
10,11-dihydro-7-trifluoromethyl-5-(2-aminoethyl)-5,10-epoxy-5H-dibenzo[a,d]cycloheptene;
10,11-dihydro-7-trifluoromethyl-5-(2-N-methylaminoethyl)-5,10-epoxy-5H-dibenzo[a,d]cycloheptene;
10,11-dihydro-7-trifluoromethyl-5-(2-N,N-dimethylaminoethyl)-5,10-epoxy-5H-dibenzo[a,d]cycloheptene;
10,11-dihydro-7-trifluoromethyl-5-(2-aminoethyl)-5,10-epoxy-11-hydroxy-5H-dibenzo[a,d]cycloheptene;
10,11-dihydro-7-trifluoromethyl-5-(2-N-methylaminoethyl)-5,10-epoxy-11-hydroxy-5H-dibenzo[a,d]cycloheptene;
10,11-dihydro-7-trifluoromethyl-5-(2-N,N-dimethylaminoethyl)-5,10-epoxy-11-hydroxy-5H-dibenzo[a,d]cycloheptene;
10,11-dihydro-3-methylsulfonyl-5-(2-aminoethyl)-5,10-epoxy-5H-dibenzo[a,d]cycloheptene;
10,11-dihydro-3-methylsulfonyl-5-(2-N-methylaminoethyl)-5,10-epoxy-5H-dibenzo[a,d]cycloheptene;
10,11-dihydro-3-methylsulfonyl-5-(2-N,N-dimethylaminoethyl)-5,10-epoxy-5H-dibenzo[a,d]cycloheptene;
10,11-dihydro-3-methylsulfonyl-5-(2-aminoethyl)-5,10-epoxy-11-hydroxy-5H-dibenzo[a,d]cycloheptene;
10,11-dihydro-3-methylsulfonyl-5-(2-N-methylaminoethyl)-5,10-epoxy-11-hydroxy-5H-dibenzo[a,d]cycloheptene;
10,11-dihydro-3-methylsulfonyl-5-(2-N,N-dimethylaminoethyl)-5,10-epoxy-11-hydroxy-5H-dibenzo[a,d]cycloheptene;
10,11-dihydro-7-methylsulfonyl-5-(2-aminoethyl)-5,10-epoxy-5H-dibenzo[a,d]cycloheptene;
10,11-dihydro-7-methylsulfonyl-5-(2-N-methylaminoethyl)-5,10-epoxy-5H-dibenzo[a,d]cycloheptene;
10,11-dihydro-7-methylsulfonyl-5-(2-N,N-dimethylaminoethyl)-5,10-epoxy-5H-dibenzo[a,d]cycloheptene;
10,11-dihydro-7-methylsulfonyl-5-(2-aminoethyl)-5,10-epoxy-11-hydroxy-5H-dibenzo[a,d]cycloheptene;
10,11-dihydro-7-methylsulfonyl-5-(2-N-methylaminoethyl)-5,10-epoxy-11-hydroxy-5H-dibenzo[a,d]cycloheptene;
10,11-dihydro-7-methylsulfonyl-5-(2-N,N-dimethylaminoethyl)-5,10-epoxy-11-hydroxy-5H-dibenzo[a,d]cycloheptene;
10,11-dihydro-3-methylmercapto-5-(2-aminoethyl)-5,10-epoxy-5H-dibenzo[a,d]cycloheptene;
10,11-dihydro-3-methylmercapto-5-(2-N-methylaminoethyl)-5,10-epoxy-5H-dibenzo[a,d]cycloheptene;
10,11-dihydro-3-methylmercapto-5-(2-N,N-dimethylaminoethyl)-5,10-epoxy-5H-dibenzo[a,d]cycloheptene;
10,11-dihydro-3-methylmercapto-5-(2-aminoethyl)-5,10-epoxy-11-hydroxy-5H-dibenzo[a,d]cycloheptene;
10,11-dihydro-3-methylmercapto-5-(2-N-methylaminoethyl)-5,10-epoxy-11-hydroxy-5H-dibenzo[a,d]cycloheptene;
10,11-dihydro-3-methylcercapto-5-(2-N,N-dimethylaminoethyl)-5,10-epoxy-11-hydroxy-5H-dibenzo[a,d]cycloheptene;
10,11-dihydro-7-methylmercapto-5-(2-aminoethyl)-5,10-epoxy-5H-dibenzo[a,d]cycloheptene;
10,11-dihydro-7-methylmercapto-5-(2-N-methylaminoethyl)-5,10-epoxy-5H-dibenzo[a,d]cycloheptene;
10,11-dihydro-7-methylmercapto-5-(2-N,N-dimethylaminoethyl)-5,10-epoxy-5H-dibenzo[a,d]cycloheptene;
10,11-dihydro-7-methylmercapto-5-(2-aminoethyl)-5,10-epoxy-11-hydroxy-5H-dibenzo[a,d]cycloheptene;
10,11-dihydro-7-methylmercapto-5-(2-N-methylaminoethyl)-5,10-epoxy-11-hydroxy-5H-dibenzo[a,d]cycloheptene;
10,11-dihydro-7-methylmercapto-5-(2-N,N-dimethylaminoethyl)-5,10-epoxy-11-hydroxy-5H-dibenzo[a,d]cycloheptene;
10,11-dihydro-3-dimethylsulfamoyl-5-(2-aminoethyl)-5,10-epoxy-5H-dibenzo[a,d]cycloheptene;

10,11-dihydro-3-dimethylsulfamoyl-5-(2-N-methylaminoethyl)-5,10-epoxy-5H-dibenzo[a,d]cycloheptene;
10,11-dihydro-3-dimethylsulfamoyl-5-(2-N,N-dimethylaminoethyl)-5,10-epoxy-5H-dibenzo[a,d]cycloheptene;
10,11-dihydro-3-dimethylsulfamoyl-5-(2-aminoethyl)-5,10-epoxy-11-hydroxy-5H-dibenzo[a,d]cycloheptene;
10,11-dihydro-3-dimethylsulfamoyl-5-(2-N-methylaminoethyl)-5,10-epoxy-11-hydroxy-5H-dibenzo[a,d]cycloheptene;
10,11-dihydro-3-dimethylsulfamoyl-5-(2-N,N-dimethylaminoethyl)-5,10-epoxy-11-hydroxy-5H-dibenzo[a,d]cycloheptene;
10,11-dihydro-7-dimethylsulfamoyl-5-(2-aminoethyl)-5,10-epoxy-5H-dibenzo[a,d]cycloheptene;
10,11-dihydro-7-dimethylsulfamoyl-5-(2-N-methylaminoethyl)-5-10-epoxy-5H-dibenzo[a,d]cycloheptene;
10,11-dyhydro-7-dimethylsulfamoyl-5-(2-N,N-dimethylaminoethyl)-5,10-epoxy-5H-dibenzo[a,d]cycloheptene;
10,11-dihydro-7-dimethylsulfamoyl-5-(2-aminoethyl)-5,10-epoxy-11-hydroxy-5H-dibenzo[a,d]cycloheptene;
10,11-dihydro-7-dimethylsulfamoyl-5-(2-N-methylaminoethyl)-5,10-epoxy-11-hydroxy-5H-dibenzo[a,d]cycloheptene;
10,11-dihydro-7-dimethylsulfamoyl-5-(2-N,N-dimethylaminoethyl)-5,10-epoxy-11-hydroxy-5H-dibenzo[a,d]cycloheptene;
10,11-dihydro-3-methoxy-5-(2-aminoethyl)-5,10-epoxy-5H-dibenzo[a,d]cycloheptene;
10,11-dihydro-3-methoxy-5-(2-N-methylaminoethyl)-5,10-epoxy-5H-dibenzo[a,d]cycloheptene;
10,11-dihydro-3-methoxy-5-(2-N,N-dimethylaminoethyl)-5,10-epoxy-5H-dibenzo[a,d]cycloheptene;
10,11-dihydro-3-methoxy-5-(2-aminoethyl)-5,10-epoxy-11-hydroxy-5H-dibenzo[a,d]cycloheptene;
10,11-dihydro-3-methoxy-5-(2-N-methylaminoethyl)-5,10-epoxy-11-hydroxy-5H-dibenzo[a,d]cycloheptene;
10,11-dihydro-3-methoxy-5-(2-N,N-dimethylaminoethyl)-5,10-epoxy-11-hydroxy-5H-dizenbo[a,d]cycloheptene;
10,11-dihydro-7-methoxy-5-(2-aminoethyl)-5,10-epoxy-5H-dibenzo[a,d]cycloheptene;
10,11-dihydro-7-methoxy-5-(2-N-methylaminoethyl)-5,10-epoxy-5H-dibenzo[a,d]cycloheptene;
10,11-dihydro-7-methoxy-5-(2-N,N-dimethylaminoethyl)-5-10-epoxy-5H-dibenzo[a,d]cycloheptene;
10,11-dihydro-7-methoxy-5-(2-aminoethyl)-5,10-epoxy-11-hydroxy-5H-dibenzo[a,d]cycloheptene;
10,11-dihydro-7-methoxy-5-(5-N-methylaminoethyl)-5,10-epoxy-11-hydroxy-5H-dibenzo[a,d]cycloheptene;
10,11-dihydro-7-methoxy-5-(2-N,N-dimethylaminoethyl)-5,10-epoxy-11-hydroxy-5H-dibenzo[a,d]cycloheptene;
10,11-dihydro-1-chloro-5-(2-aminoethyl)-5,10-epoxy-5H-dibenzo[a,d]cycloheptene;
10,11-dihydro-1-chloro-5-(2-N-methylaminoethyl)-5,10-epoxy-5H-dibenzo[a,d]cycloheptene;
10,11-dihydro-1-chloro-5-(2-N,N-dimethylaminoethyl)-5,10-epoxy-5H-dibenzo[a,d]cycloheptene;
10,11-dihydro-1-chloro-5-(2-aminoethyl)-5,10-epoxy-11-hydroxy-5H-dibenzo[a,d]cycloheptene;
10,11-dihydro-1-chloro-5-(2-N-methylaminoethyl)-5,10-epoxy-11-hydroxy-5H-dibenzo[a,d]cycloheptene;
10,11-dihydro-1-chloro-5-(2-N,N-dimethylaminoethyl)-5,10-epoxy-11-hydroxy-5H-dibenzo[a,d]cycolheptene;
10,11-dihydro-9-chloro-5-(2-aminoethyl)-5,10-epoxy-5H-dibenzo[a,d]cycloheptene;
10,11-dihydro-9-chloro-5-(2-N-methylaminoethyl)-5,10-epoxy-5H-dibenzo[a,d]cycloheptene;
10,11-dihydro-9-chloro-5-(2-N,N-dimethylaminoethyl)-5,10-epoxy-5H-dibenzo[a,d]cycloheptene;
10,11-dihydro-9-chloro-5-(2-aminoethyl)-5,10-epoxy-11-hydroxy-5H-dibenzo[a,d]cycloheptene;
10,11-dihydro-9-chloro-5-(2-N-methylaminoethyl)-5,10-epoxy-11-hydroxy-5H-dibenzo[a,d]cycloheptene;
10,11-dihydro-9-chloro-5-(2-N,N-dimethylaminoethyl)-5,10-epoxy-11-hydroxy-5H-dibenzo[a,d]cycloheptene;
10,11-dihydro-3-chloro-7-dimethylsulfamoyl-5-(2-aminoethyl)-5,10-epoxy-5H-dibenzo[a,d]cycloheptene;
10,11-dihydro-3-chloro-7-dimethylsulfamoyl-5-(2-N-methylaminoethyl)-5,10-epoxy-5H-dibenzo[a,d]cycloheptene;
10,11-dihydro-3-chloro-7-dimethylsulfamoyl-5-(2-N,N-dimethylaminoethyl)-5,10-epoxy-5H-dibenzo[a,d]cycloheptene;
10,11-dihydro-3-chloro-7-dimethylsulfamoyl-5-(2-aminoethyl)-5,10-epoxy-11-hydroxy-5H-dibenzo[a,d]cycloheptene;
10,11-dihydro-3-chloro-7-dimethylsulfamoyl-5-(2-N-methylaminoethyl)-5,10-epoxy-11-hydroxy-5H-dibenzo[a,d]cycloheptene;
10,11-dihydro-3-chloro-7-dimethylsulfamoyl-5-(2-N,N-dimethylaminoethyl)-5,10-epoxy-11-hydroxy-5H-dibenzo[a,d]cycloheptene;
10,11-dihydro-3-dimethylsulfamoyl-7-chloro-5-(2-aminoethyl)-5,10-epoxy-5H-dibenzo[a,d]cycloheptene;
10,11-dihydro-3-dimethylsulfamoyl-7-chloro-5-(2-N-methylaminoethyl)-5,10-epoxy-5H-dibenzo[a,d]cycloheptene;
10,11-dyhydro-3-dimethylsulfamoyl-7-chloro-5-(2-N,N-dimethylaminoethyl)-5,10-epoxy-5H-dibenzo[a,d]cycloheptene;
10,11-dihydro-3-dimethylsulfamoyl-7-chloro-5-(2-aminoethyl)-5,10-epoxy-11-hydroxy-5H-dibenzo[a,d]cycloheptene;
10,11-dihydro-3-dimethylsulfamoyl-7-chloro-5-(2-N-methylaminoethyl)-5,10-epoxy-11-hydroxy-5H-dibenzo[a,d]cycloheptene;
10,11-dihydro-3-dimethylsulfamoyl-7-chloro-5-(2-N,N-dimethylaminoethyl)-5,10-epoxy-11-hydroxy-5H-dibenzo[a,d]cycloheptene;
10,11-dihydro-5-(2-aminoethyl)-5,10-epoxy-11-methoyloxy-5H-dibenzo[a,d]cycloheptene;
10,11-dihydro-5-(2-N-methylaminoethyl)-5,10-epoxy-11-methoyloxy-5H-dibenzo[a,d]cycloheptene;
10,11-dihydro-5-(2-N,N-dimethylaminoethyl)-5,10-epoxy-11-methoyloxy-5H-dibenzo[a,d]cycloheptene;
10,11-dihydro-5-(2-aminoethyl)-5,10-epoxy-11-methylsulfonamido-5H-dibenzo[a,d]cycloheptene;
10,11-dihydro-5-(2-N-methylaminoethyl)-5,10-epoxy-11-methylsulfonamido-5H-dibenzo[a,d]cycloheptene;
10,11-dihydro-5-(2-N,N-dimethylaminoethyl)-5,10-epoxy-11-methylsulfonamido-5H-dibenzo[a,d]cycloheptene;
10,11-dihydro-5-(2-aminoethyl)-5,10-epoxy-11-methyl-11-hydroxy-5H-dibenzo[a,d]cycloheptene;
10,11-dihydro-5-(2-N-methylaminoethyl)-5,10-epoxy-11-methyl-11-hydroxy-5H-dibenzo[a,d]cycloheptene;
10,11-dihydro-5-(2-N,N-dimethylaminoethyl)-5,10-epoxy-11-methyl-11-hydroxy-5H-dibenzo[a,d]cycloheptene;
10,11-dihydro-5-(2-aminoethyl)-5,10-epoxy-11-methyl-11-methoyloxy-5H-dibenzo[a,d]cycloheptene;
10,11-dihydro-5-(2-methylaminoethyl)-5,10-epoxy-11-methyl-11-methoyloxy-5H-dibenzo[a,d]cycloheptene;
10,11-dihydro-5-(2-N,N-dimethylaminoethyl)-5,10-epoxy-11-methyl-11-methoyloxy-5H-dibenzo[a,d]cycloheptene.

Any of the foregoing wherein any or all of the N-methyl substituents on the 5-(aminoalkyl) moiety are replaced with ethyl, n-propyl, i-propyl, n-butyl, sec-butyl, i-butyl, or t-butyl, for example:

10,11 - dihydro - 5 - (2 - N - ethylaminoethyl) - 5,10-epoxy - 5H - dibenzo - [a,d]cycloheptene;
10,11 - dihydro - 5 - (2 - N - propylaminoethyl) - 5,10-epoxy - 5H - dibenzo - [a,d]cycloheptene;
10,11 - dihydro 1 5 - (2 - N - t - butylaminoethyl) - 5,10-epoxy - 5H - dibenzo[a,d]cycloheptene.

Although in the above described reaction sequences and examples the compounds of the trans series of the compounds of this invention are shown to be produced it is to be understood that the corresponding cis series is within the scope of this invention. The desired cis isomer can generally be produced from the corresponding cis isomer of the N-oxide derivative (I). The following reaction sequence is illustrative:

Reaction Sequence III

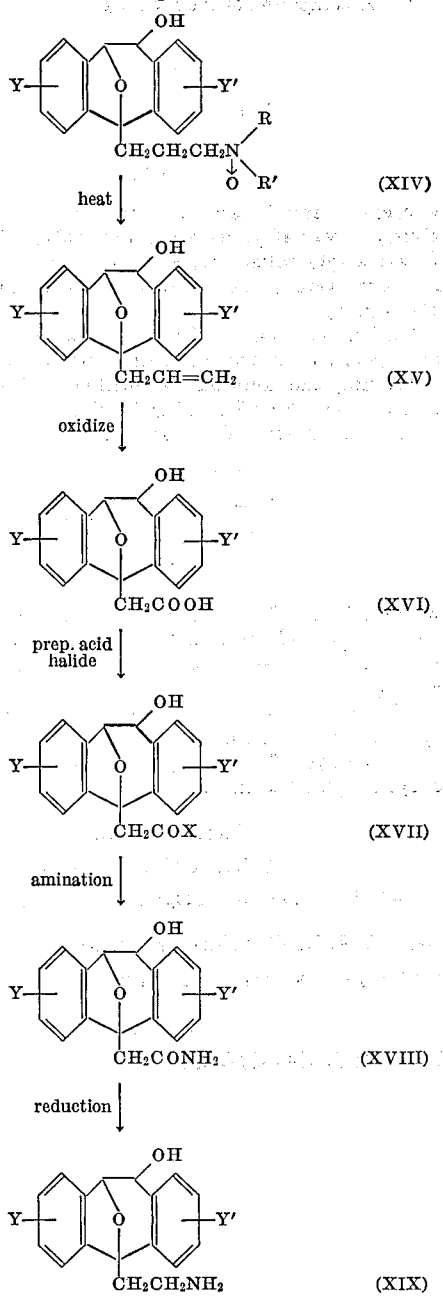

The reaction proceeds from the cis N-oxide derivative XIV through cis intermediates XV–XVIII using the techniques discussed in connection with Reaction Sequence I above. The cis amide XVIII can be reduced to the corresponding cis primary amine XIX as in Reaction Sequence I.

In either the cis or trans series, to produce the tertiary methyl amino derivative:

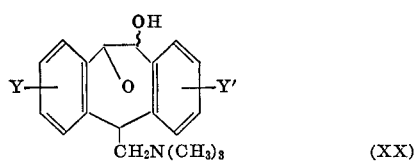

the Eschweiler-Clarke modification of the Leuckart reaction can be employed. Conventional selective acylation and reduction can be used to produce the following tertiary lower-alkyl or secondary lower-alkyl derivatives:

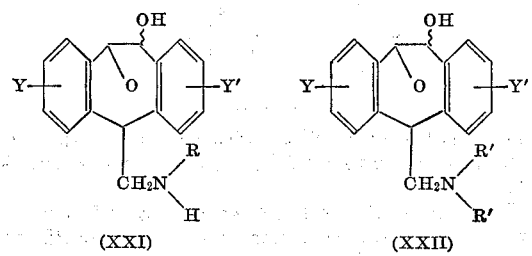

wherein R is lower-alkyl and R' is the same or different $C_2$–$C_4$ lower-alkyl.

As previously stated, the compounds of this invention can be administered orally in various dosage forms. Preferred are tablets and capsules. The following examples illustrate methods of formulating these dosage forms. In these examples the active ingredient is formulated as the hydrogen maleate salt, but other acid addition salts, such as the hydrochloride, can be employed with equal facility.

EXAMPLE 17

Tablets: Tablets for oral administration are prepared by mixing the active ingredient with appropriate amounts of excipients and binding agents, formed into tablets by a conventional tableting machine and coated so that each tablet will have the following composition.

| | Per tablet, mg. |
|---|---|
| 10,11-dihydro-5-(aminoethyl) - 5,10 - epoxy-11-hydroxy - 5H - dibenzo[a,d]cycloheptene hydrogen maleate | 10 |
| Cellulose filter aid | 11 |
| Lactose | 9 |
| Calcium phosphate dibasic | 143 |
| Guar gum | 6.1 |
| Corn starch | 4 |
| Magnesium stearate | 0.9 |
| Opaque yellow film coating | 3 |

EXAMPLE 18

Capsules: Capsules for oral administration are prepared by dispersing the active ingredient in lactose and magnesium stearate and encapsulating the mixture in standard soft gelatin capsules so that each capsule will have the following composition.

| | Per capsule, mg. |
|---|---|
| 10,11-dihydro-5-(aminoethyl)-5,10-epoxy - 5H - dibenzo[a,d]cycloheptene hydrogen maleate | 5 |
| Lactose | 430 |
| Magnesium stearate | 5 |

I claim:

1. A compound of the formula

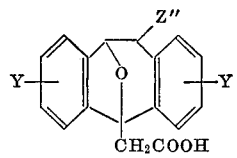

wherein Y and Y' can be the same or different and are halo, trifluoro lower-alkyl, lower-alkoxy, lower-alkylmercapto, lower-alkylsulfonyl, or di(lower-alkyl)sulfamoyl; Z" is keto, lower-alkoxy, lower-alkanoyloxy, lower-alkylsulfonamido, and when Z is lower-alkanoyloxy there can be a lower-alkyl replacing the hydrogen at the 11-position.

2. The compound of claim 1 where Y is hydrogen; Y' is hydrogen, chloro, trifluoromethyl, or methylsulfonyl; and Z" is hydroxy or keto.

3. 10,11 - dihydro-5,10-epoxy-11-keto - 5H - dibenzo[a,d]cycloheptene-5-acetic acid.

4. A compound of the formula

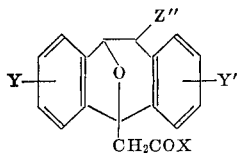

wherein Y is hydrogen; Y' is hydrogen, chloro, trifluoromethyl or methylsulfonyl; Z" is hydroxy or keto and X is halo.

5. The compound of claim 4 where Y is hydrogen; Y' is hydrogen, chloro, trifluoromethyl or methylsulfonyl; and Z" is hydroxy or keto.

6. 10,11-dihydro - 5,10 - epoxy-11-keto - 5H - dibenzo[a.d]cyclohepten-5-acetylchloride.

7. A compound of the formula

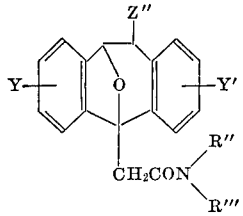

wherein Y is hydrogen; Y' is hydrogen, chloro, trifluoromethyl or methylsulfonyl; Z" is hydroxy or keto; X is halo; and R" and R''' can be hydrogen or lower alkyl.

8. The compound of claim 7 where Y is hydrogen; Y' is hydrogen, chloro, trifluoromethyl, or methylsulfonyl; and Z" is hydroxy or keto.

9. 10,11 - dihydro-5,10-epoxy-11-keto - 5H - dibenzo-[a.d]cyclohepten-5-acetamide.

10. A compound of the formula

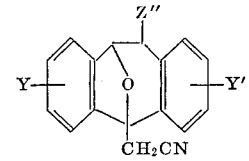

wherein Y and Y' can be the same or different and are halo, trifluorolower-alkyl, lower-alkoxy, lower-alkylmercapto, lower-alkylsulfonyl, or di(lower-alkyl)sulfamoyl; Z" is keto, lower-alkoxy, lower-alkanoyloxy, lower-alkylsulfonamide, and when Z is lower-alkanoyloxy there can be a lower-alkyl replacing the hydrogen at the 11-position.

11. The compound of claim 10 where Y is hydrogen; Y' is hydrogen, chloro, trifluoromethyl, or methylsulfonyl; and Z" is hydroxy or keto.

12. 10,11 - dihydro-5,10-epoxy-11-keto - 5H - dibenzo-[a,d]cyclohepten-5-acetonitrile.

13. A compound of the formula

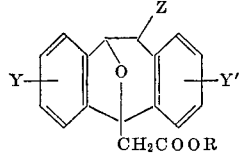

wherein Y and Y' are halo, trifluorolower-alkyl, lower-alkoxy, lower-alkylmercapto, lower-alkylsulfonyl, or di-(lower-alkyl) sulfamoyl; R is lower alkyl or phenyl and Z is a thioketal or two mercapto moieties attached to the 11-position.

14. The compound of claim 16 where Y and Y' are hydrogen, chloro, trifluoromethyl, or methylsulfonyl.

15. Ethylene thioketal of methyl 10,11-dihydro-5,10-epoxy-11-keto-5H-dibenzo[a,d]cyclohepten-5-acetate.

16. A compound of the formula

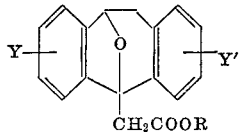

wherein Y and Y' are halo, trifluorolower-alkyl, lower-alkoxy, lower-alkylmercapto, lower-alkylsulfonyl, or di-(lower-alkyl)sulfamoyl and R is lower alkyl, phenyl or hydrogen.

17. 10,11 - dihydro-5,10-epoxy - 5H - dibenzo[a,d]-cyclohepten-5-acetic acid.

18. Methyl 10,11 - dihydro-5,10-epoxy-5H-dibenzo[a,d]cyclohepten-5-acetate.

References Cited

FOREIGN PATENTS 649,168  12/1964  Belgium _____ 260—345.2

HENRY R. JILES, Primary Examiner

J. M. FORD, Assistant Examiner

U.S. Cl. X.R.

260—345.2; 424—277, 283

UNITED STATES PATENT OFFICE
CERTIFICATE OF CORRECTION

Patent No. 3,557,144        Dated January 19, 1971

Inventor(s) Marcia E. Christy

It is certified that error appears in the above-identified patent and that said Letters Patent are hereby corrected as shown below:

Column 2 line 3, delete "ether" and insert -- ester --
Column 4 line 67, insert -- -OR -- after the word "keto"; l 69, insert -- -OR -- after the word "keto"; line 72, delete "amine" and insert -- amide --. Column 5 line 31 of struct formula, delete "$CH_2COOH$" and insert -- $CH_2COOR$ --; line 41 structural formula, delete "X" and insert -- Y --; line 44 structural formula, delete "$CH_2COOH$" and insert -- $CH_2COOR$ Column 9 line 65, insert -- Anál. pending -- after "déc.".

Signed and sealed this 16th day of November 1971.

(SEAL)
Attest:

EDWARD M. FLETCHER, JR.        ROBERT GOTTSCHALK
Attesting Officer        Acting Commissioner of Pat

R-675.42-H